G. F. SUPPES.
LOCKING BRAKE.
APPLICATION FILED NOV. 27, 1911.
1,045,632.
Patented Nov. 26, 1912.
2 SHEETS—SHEET 2.
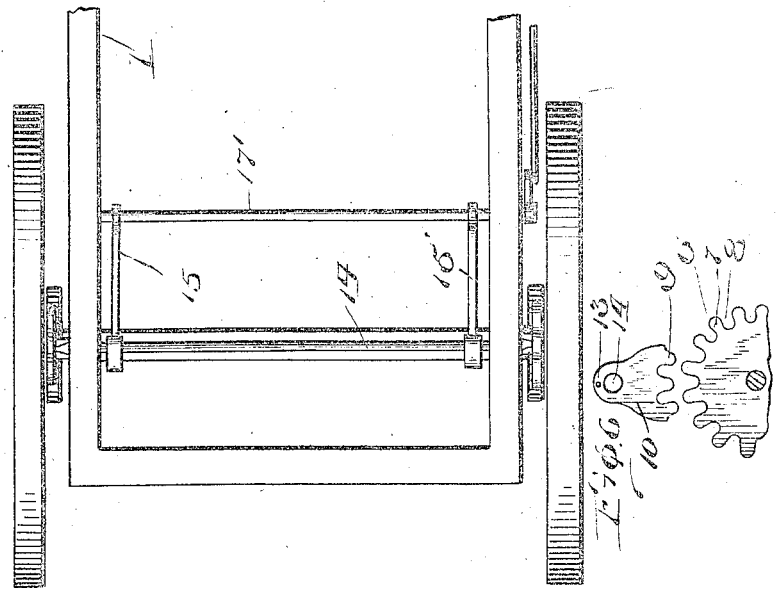
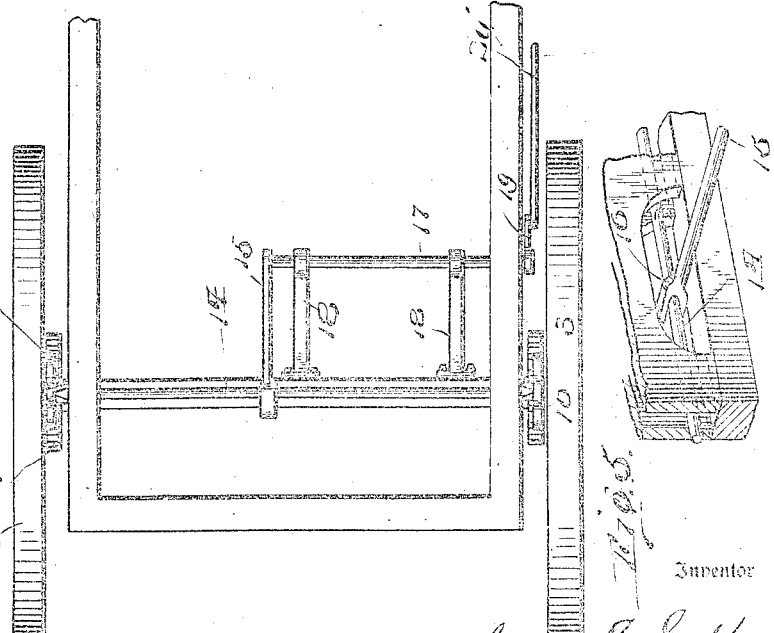

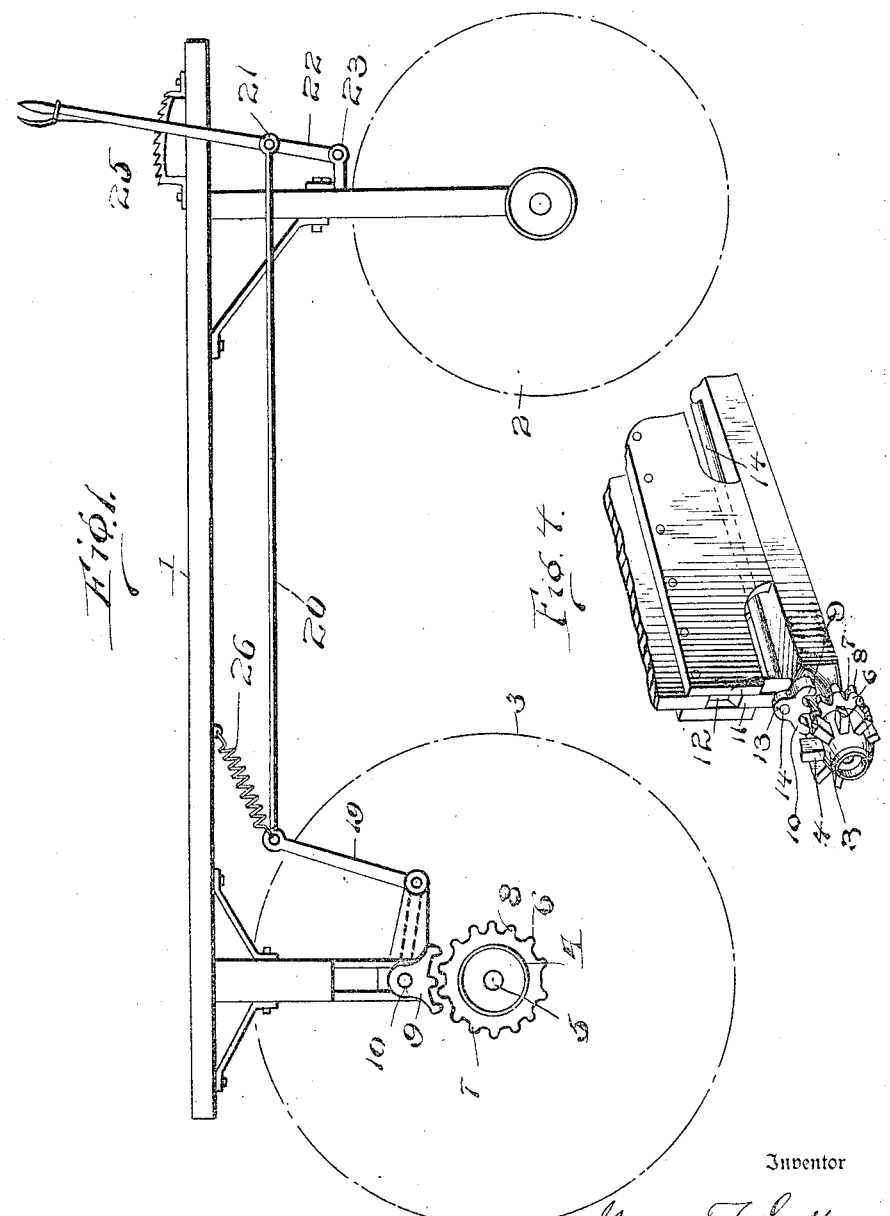

UNITED STATES PATENT OFFICE.

GEORGE F. SUPPES, OF GREENSBORO, NORTH CAROLINA.

LOCKING-BRAKE.

1,045,632.
Specification of Letters Patent.
Patented Nov. 26, 1912.

Application filed November 27, 1911. Serial No. 662,870.

*To all whom it may concern:*

Be it known that I, GEORGE F. SUPPES, a citizen of the United States, residing at Greensboro, in the county of Guilford and State of North Carolina, have invented certain new and useful Improvements in Locking-Brakes; and I do hereby declare the following to be a full, clear, and exact description of the invention, such as will enable others skilled in the art to which it appertains to make and use the same.

This invention relates to improvements in locks for vehicle wheels, and has for an object the arrangement of improved means for clutching and holding wheels against rotation.

A further object of the invention is the arrangement of improved means which may be readily thrown into operation for positively locking the wheels of a vehicle after the vehicle has stopped for preventing the movement of the vehicle until the wheels have been unlocked, said means including an intergearing device associated with the wheels and operating mechanism arranged at any convenient place on the vehicle for throwing in and out the intergearing device as may be desired.

A still further object of the invention is the arrangement of a gear wheel structure on some of the wheels of a vehicle designed to coact with a reciprocating locking member which may be moved into and out of engagement with the teeth of the gear wheel, whereby the gear wheel, and also the traction wheel connected therewith, will be either locked or unlocked.

With these and other objects in view the invention comprises certain novel constructions, combinations, and arrangement of parts as will be hereinafter more fully described and claimed.

In the accompanying drawings: Figure 1 is a side view of an embodiment of the invention. Fig. 2 is a top plan view of the operating parts of the invention shown applied to a vehicle, certain parts being broken away for better illustrating the construction and arrangement. Fig. 3 is a view similar to Fig. 2 but disclosing a slightly modified form of the invention. Fig. 4 is a detail fragmentary perspective view disclosing the reciprocating guide and associated parts. Fig. 5 is a detail fragmentary perspective view showing the operating arm. Fig. 6 is an enlarged side view of a geared locking member and a coacting gear.

In forming a device embodying the invention means are provided for locking one or more of the wheels of a vehicle against rotation so that the vehicle cannot readily be moved. It is aimed to provide means which will dispense with an ordinary weight for draft animals, and yet arrange something which will prevent or at least largely lessen the chances of the draft animals moving any considerable distance from where they are originally stationed. The device embodying the invention is so arranged as to be readily thrown into operation when the vehicle is stopped, and to be again as readily thrown out of operation when the vehicle is started, so that the time and trouble necessary for applying a weight is not required. In accomplishing these ends a gear wheel is rigidly secured to one or more of the wheels of the vehicle, preferably to the two rear wheels. Arranged to coact with and intermesh with these gear wheels are locking members formed with teeth designed to engage the teeth on the wheels. Each of these locking members is rigidly connected with a reciprocating member which permits the locking member to be raised and lowered so as to cause the same to engage and disengage the gears. It will be evident that some other movement besides a vertical movement may be utilized for causing the engagement and disengagement of the locking members and gear wheels. Associated with the reciprocating members is a system of levers and links, and also a controlling lever for throwing the locking members into and out of operation readily, from the side of the vehicle, or any other convenient point as may be desired.

In order that the invention may be more clearly understood an embodiment of the same is shown in the accompanying drawings in which 1 indicates a vehicle of any desired kind, provided with wheels 2 and 3. The wheel 3 has a hub 4 of any usual or preferred structure to which is rigidly secured a gear wheel structure 5. Gear wheel structure 5 has the teeth 6 thereof arranged so that the sides 7 are arranged so as to extend substantially radially and merge into rounded ends 8. This construction and arrangement of teeth permits the teeth 9 of locking member 10 to freely engage and disengage the gear wheel structure 4, the teeth 9 being similarly constructed. Rigidly connected with the locking member 10 is a slide 11 which moves or reciprocates in a guide 12. The locking member 10 is secured to slide 11 in any desired way, preferably, however, by a screw or bolt 13 and a shaft 14. Shaft 14 extends from one side of the vehicle to the other, so that a locking member may be arranged on each side of the vehicle for engaging the gear wheel structure on each wheel. As shown in Fig. 2 a gear wheel structure 4' is provided for wheel 3' and a locking member 10' is arranged to engage the gear wheel structure 4'. The locking member 10' is rigidly connected with shaft 14, and is connected with a slide similar to slide 11 so that both of the locking members may be reciprocated toward and from their respective gear wheel structures 4 and 4'.

In order to cause a movement of the locking members 10 and 10' toward and from their respective gear wheel structures an operating arm 15 is provided arranged with a bifurcated end 16 which spans the central part of shaft 14. The operating arm 15 is rigidly connected with a rock shaft 17 so that when rock shaft 17 is rocked or moved movement will be conveyed to shaft 14 for raising and lowering the same, and consequently for engaging and disengaging the locking members. The rock shaft 17 is journaled in brackets 18 which are rigidly connected with the axle of the vehicle, or to any other convenient member as desired for properly supporting the shaft. Rigidly connected with the outer end of rock shaft 17 is an arm 19 to which is pivotally connected a link 20. Link 20 is arranged to extend forwardly to any convenient point near the front of the vehicle, and to be pivotally connected at 21 to a hand operated lever 22. Hand operated lever 22 is pivotally mounted at 23 to a convenient point on the vehicle, designed to engage a suitable rack 25. By this structure the lever 22 may be moved forwardly and locked in that position which will cause the raising of the locking members 10 and 10' and the holding of said members in a raised position. In order to positively prevent the engagement of the locking members with their respective gear structures a spring 26 is provided which engages the vehicle structure at one end, and engages the arm 19 at the opposite end, and continually tends to raise or maintain raised the respective locking members, and to hold the catch 24 near the forward end of rack 25. It will be evident that by a proper manipulation of lever 22 the locking members may be raised or lowered for throwing into operation the locking members 10 and 10', or if desired for withdrawing said locking members. By this construction and arrangement it will be observed that the wheels are positively locked against either a forward or rearward movement. It will also be noted that by the shape of the teeth 6 and 9 the locking members and the gear structures will readily engage or become interlocked.

Referring more particularly to Fig. 3 wherein the modified parts will be designated by additional numbers, it will be seen that shaft 17' extends entirely across the vehicle, and is journaled in any suitable means at the sides of the vehicle. It will also be observed that shaft 17' carries a pair of operating arms 15' instead of a single operating arm, and that these operating arms are arranged near each side of the vehicle for engaging the shaft 14 near the ends thereof.

What I claim is:

In a device of the character described the combination with a vehicle of a gear wheel connected with the hub of one of the wheels thereof said gear wheel being formed with teeth having rounded ends, a reciprocating block formed with teeth having rounded ends designed to intermesh with the teeth of said gear wheel, when moved to one position, a reciprocating guide rigidly connected with said block, guide ways for regulating the movement of said guide, whereby said block is caused to move toward and from said gear wheel, a shaft integral with said block and parallel with the axle of the vehicle, an operating arm provided with bifurcated ends engaging said shaft, a rock shaft supported by brackets engaging said operating arm for operating said guide and throwing said block into and out of operation.

In testimony whereof I affix my signature in presence of two witnesses.

GEORGE F. SUPPES

Witnesses:
 R. H. MILTON,
 R. G. SLOAN.